Jan. 15, 1924.
A. H. NELLER
1,481,108
ANIMAL PEN
Filed July 30, 1923
2 Sheets-Sheet 1
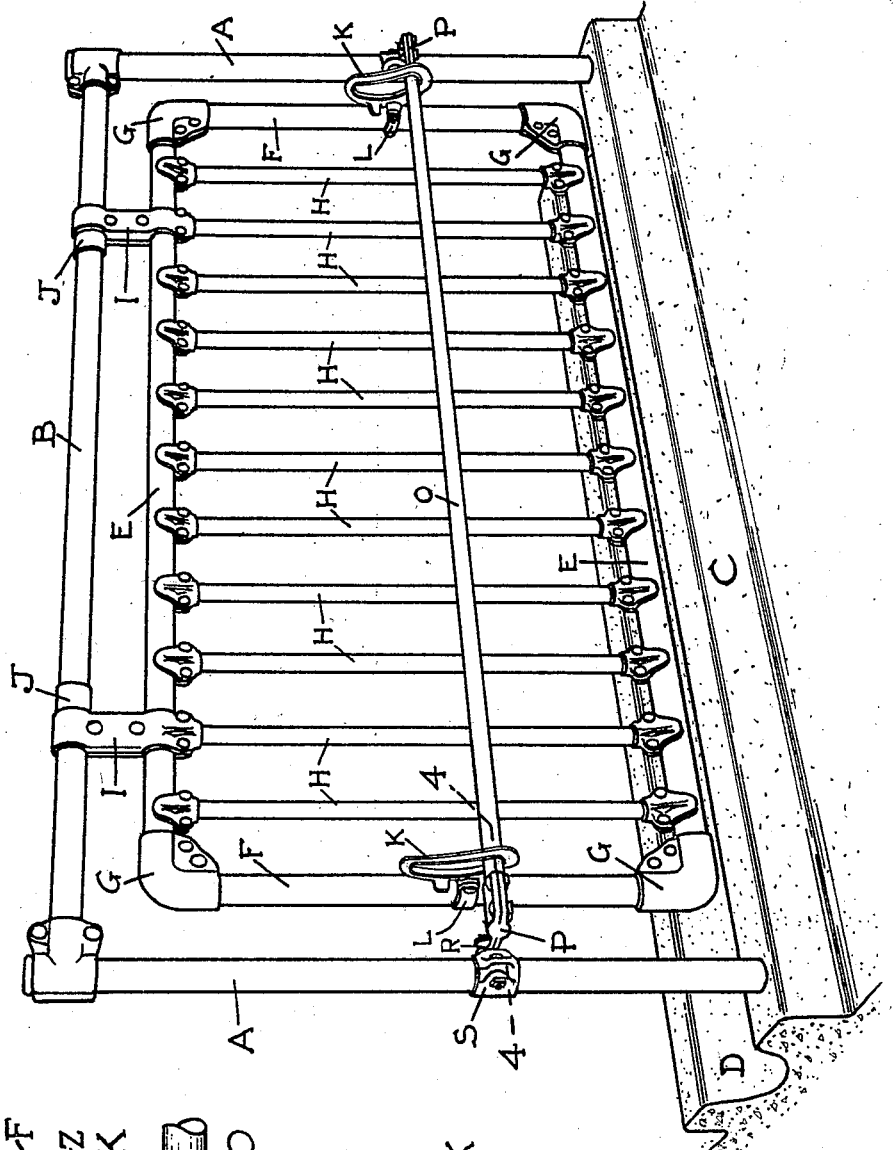
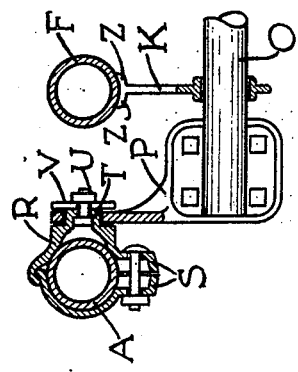
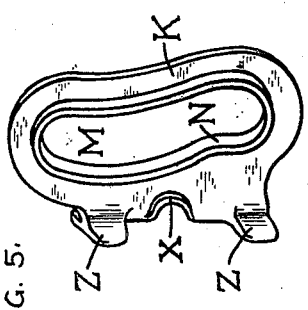
Albert H. Neller
INVENTOR
BY William Louder
ATTORNEY Jan. 15, 1924.　　　　　　　　　　1,481,108
A. H. NELLER
ANIMAL PEN
Filed July 30, 1923　　　2 Sheets-Sheet 2
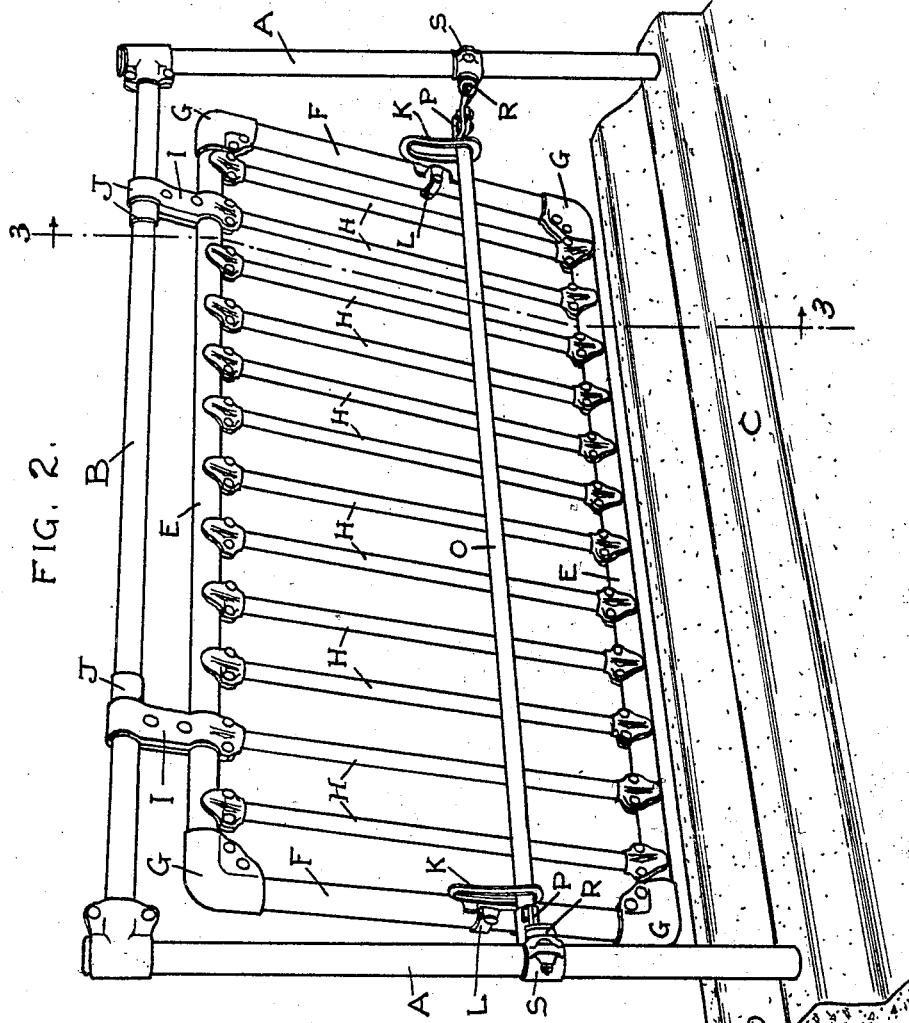
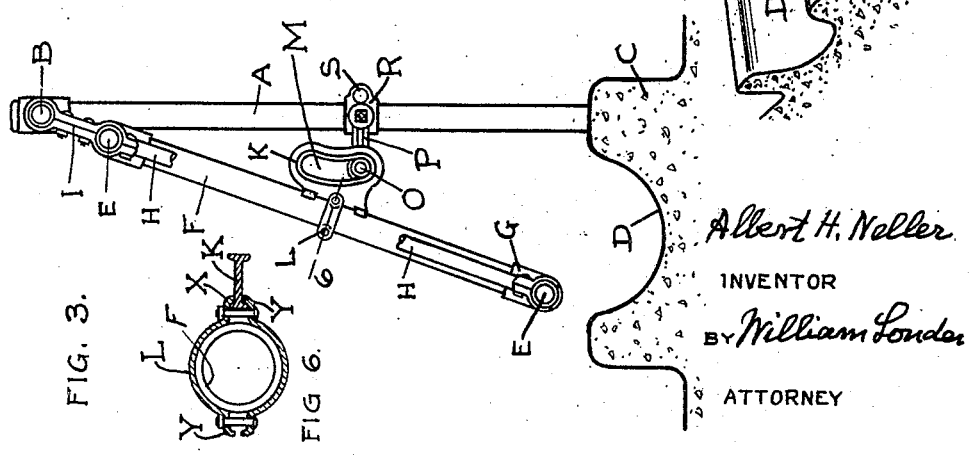
Albert H. Neller
INVENTOR
BY William Londer
ATTORNEY Patented Jan. 15, 1924.

1,481,108

UNITED STATES PATENT OFFICE.

ALBERT H. NELLER, OF FAIRFIELD, IOWA, ASSIGNOR TO THE LOUDEN MACHINERY COMPANY, OF FAIRFIELD, IOWA, A CORPORATION OF IOWA.

ANIMAL PEN.

Application filed July 30, 1923. Serial No. 654,744.

*To all whom it may concern:*

Be it known that I, ALBERT H. NELLER, a citizen of the United States, residing at Fairfield, in the county of Jefferson and State of Iowa, have invented a new and useful Improvement in Animal Pens, of which the following is a specification.

My invention relates to movable sections in panels of animal pens, and it consists of an improvement in the means by which the movable section is held in closed or in open position and changed from one position to the other; whereby the construction is greatly simplified and the opening and closing of the section is more easily and certainly accomplished, as hereinafter described, and as set forth in the claims.

In the accompanying drawings forming a part of this specification, Fig. 1 is a perspective of a panel of an animal pen embodying my invention, and showing the movable section in closed position. Fig. 2 is the same showing the movable section in open position. Fig. 3 is a vertical transverse section on line 3—3 of Fig. 2, looking in the direction of the arrow, the fillers being broken away. Fig. 4 is an enlarged transverse horizontal section on line 4—4 of Fig. 1. Fig. 5 is an enlarged detail view. Fig. 6 is a transverse section on line 6 of Fig. 3.

Referring to the drawings, A represents upright posts of a panel of an animal pen and B the top rail connecting the upper ends of the posts together. The posts are preferably set in a curb C which may also form part of a feed trough D. E represents the top and bottom rails of the movable section and F the end rails of the same connected to the top and bottom rails by elbows or corner clamps G. H represents the fillers of the section which may be joined to the top and bottom rails in any suitable manner. The movable section is secured to the top-rail of the panel by hinge members I which are preferably attached pivotally thereto and rigidly to the top-rail E of the section. To hold the hinge members in place and prevent them from slipping endwise on the rail B, collars J may be secured as shown to the rail adjoining the hinges I.

To hold the movable section in open or closed position and to change it from one position to the other, members K which may be called connecting members, are secured to central portions of the end-rails F, preferably by clips L, whereby they may be adjusted upwardly or downwardly on said end-rails. These so-called connecting members are provided with vertically disposed openings M slightly curved and having points N projecting slightly inward as most plainly shown in Fig. 5. An elongated operating member O, preferably of tubular material, is inserted in the openings M of the connecting members K, and is provided on each end, outside of the members K, with laterally extended arms P, preferably clamped thereon and having eyes on their extended ends, as most plainly shown in Fig. 4. Pivot members R are secured to central portions of the panel post A in line with the operating member O, preferably by means of clips which will readily permit the pivot members to be adjusted upwardly and downwardly on the posts A to correspond with the position of the connecting members K.

The pivoting means on the members R are preferably bosses T adapted to fit the eyes in the arms P, and to permit free rotation of the arms thereon. The bosses T are preferably provided with a central opening through which a bolt U may be passed and a washer V may be used to prevent the arms from slipping off the bosses T. By taking hold of the operating member O at any point and lifting it into the upper portion of the opening M, the arm will move to one side or the other of the posts A.

The movable section will then be in either open or closed position according to which side of the posts the arms have been turned. When in open position, the arms P and the operating member O will be on the inside of the posts A above the feed trough D, as shown in Figs. 2 and 3, and when in closed position, the arms as well as the operating member will be on the outside of the posts as shown in Fig. 1. The weight of the operating member O will tend to hold it in the lower end of the opening M and in addition to this the inwardly projecting point N, and the inwardly curved side of the member K opposite the point N, will tend to prevent the member O from being prematurely lifted, whereby the movable section will be securely held in either open or closed position until the member O is lifted by the operator in changing the section from one position to the other.

The extent of the movement of the section may be readily varied to suit requirements, such as the width of the feed trough or other requirements, by simply moving the pivot members R upward or downward on the posts A and also moving the connecting members K correspondingly upwardly or downwardly on the side rails F. Moving them upwardly will bring them closer to the hinges I and the movement of the section will be thereby increased, while moving them downwardly will place them farther from the hinges, which will lessen the extent of the movement of the section.

Fig. 6 shows the preferred method of connecting the members K to the end rails F. The portion of the members K adjoining the rails are provided with flanges X. The clips L are preferably in two parts joined together by bolts as shown. The ends of the parts comprising the clip are fitted with inwardly turned flanges Y which will catch over the adjacent flanges X on the member K and will hold it securely in position. The member K is also preferably fitted with outwardly projecting portions Z which are adapted to rest on the adjacent surface of the rails F whereby the member K will be prevented from tilting to either side. Both ends of the parts comprising the clips L are preferably made alike so that it will make no difference which ends are placed next the member K. In Fig. 3 the central portions of the fillers H next to the right hand end of Fig. 2 are broken away to give a better view of the clip L.

When the movable section is used with feed troughs, feed may be placed in the trough from the outside of the pen when the section is in open position, as shown in Figs. 2 and 3, and the animals in the pen will be prevented from placing their noses in the trough while the feed is being placed therein. When the section is in closed position, as shown in Fig. 1, the animals will have free access to the trough. The construction is extremely simple and inexpensive and is easily and quickly operated by anyone by the application of the hand or knee to the operating member O.

What I claim is:

1. In a panel for animal pens having end supports and a top support connected to the end supports, a movable section located therein and hinged to the top support, a pair of connecting members attached to said movable section near the ends thereof and each connecting member having a vertically disposed opening therein, an elongated horizontally disposed operating member, placed in the openings in said connecting members, and a laterally disposed arm secured to each end of the operating member, said arms having their outer ends pivoted to the adjacent end supports, whereby, when the operating member is moved on the pivots of its arms, it will be moved up and down in the vertical openings in the connecting members, and may be moved from one side to the other of the end supports, and the movable section will be opened and closed and will be held in either position, substantially as described.

2. In a panel for animal pens having at each end an upright post connected together at their upper ends, a movable section located between said posts and hinged at its upper side to the means connecting the posts together, a pair of connecting members having vertically disposed openings therein said connecting members being attached to the movable section near the ends thereof. An elongated horizontally disposed operating member placed in the openings in the connecting members, and laterally disposed arms secured to the ends of the operating member, said arms having their outer ends pivoted on the adjacent end post, substantially and for the purpose set forth.

3. In a panel for animal pens having at each end an upright post connected together at their upper ends by a top rail, a movable section located between said posts and hinged at its upper side to said top rail, a pair of connecting members having vertically disposed openings therein, said connecting members being attached to the movable section near the ends thereof. An elongated horizontally disposed operating member placed in the openings in the connecting members, and laterally disposed arms secured to the ends of the operating member outside of the connecting members, said arms having their outer ends pivoted on the adjacent end post, substantially and for the purpose set forth.

4. In a panel for animal pens having at each end an upright post connected together at their upper ends by a top rail, a movable section located between said posts and hinged at its upper side to said top rail, a pair of connecting members having vertically disposed openings therein, said connecting members being adjustably attached to the movable section near the ends thereof. An elongated horizontally disposed operating member placed in the openings in the connecting members, laterally disposed arms secured to the ends of the operating member outside of the connecting members, and pivots adjustably secured to the end posts adjacent to said arms, and in line with the operating member, and the outer ends of said arms being pivoted thereon, substantially as and for the purpose set forth.

ALBERT H. NELLER.